June 18, 1935.  F. J. YOUNG ET AL  2,005,122
POWER TRANSMISSION UNIT
Original Filed April 25, 1932   5 Sheets-Sheet 1
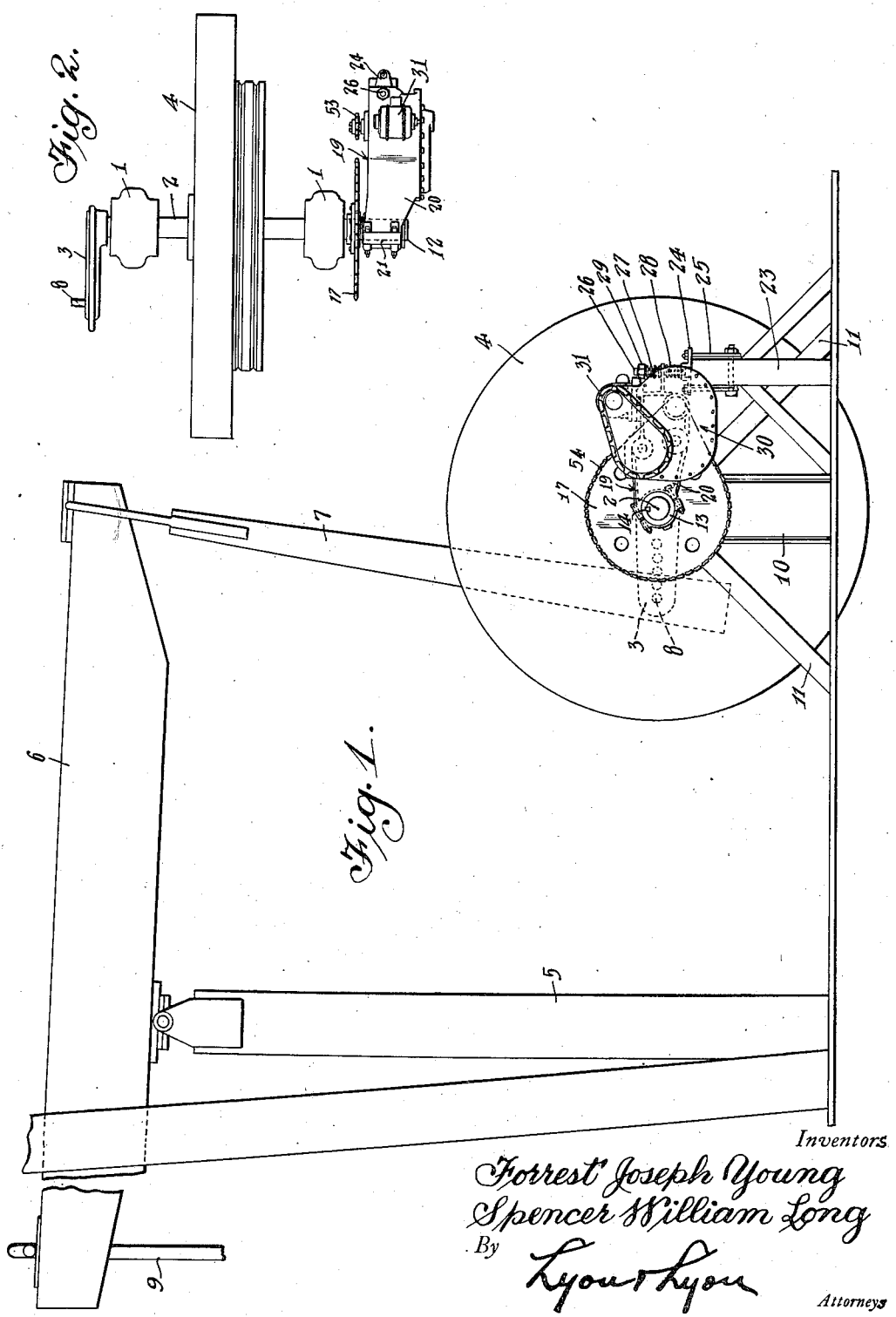
Inventors
Forrest Joseph Young
Spencer William Long
By Lyon & Lyon
Attorneys

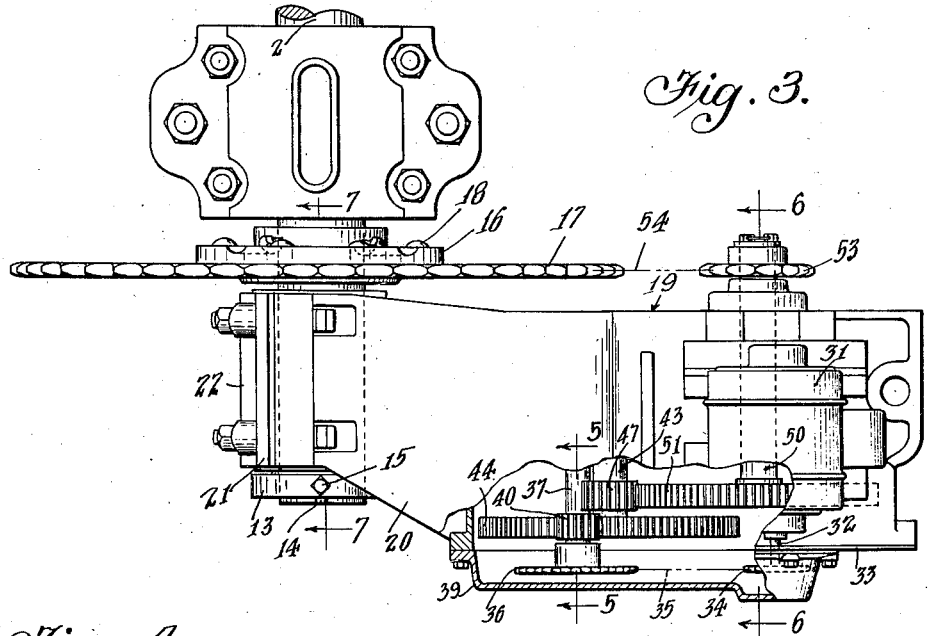
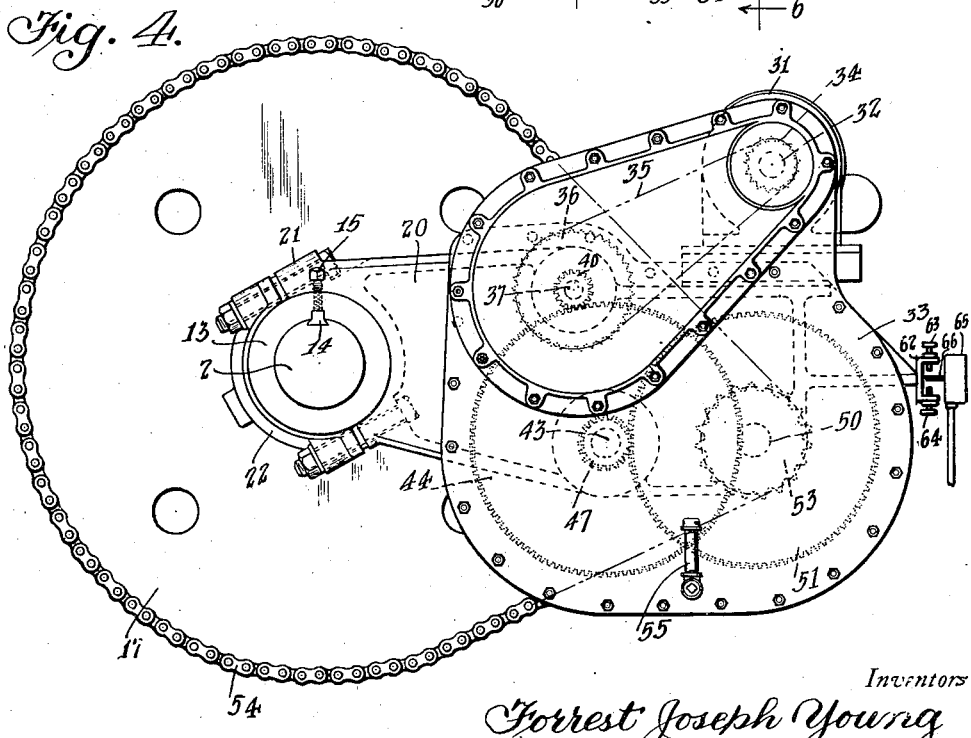

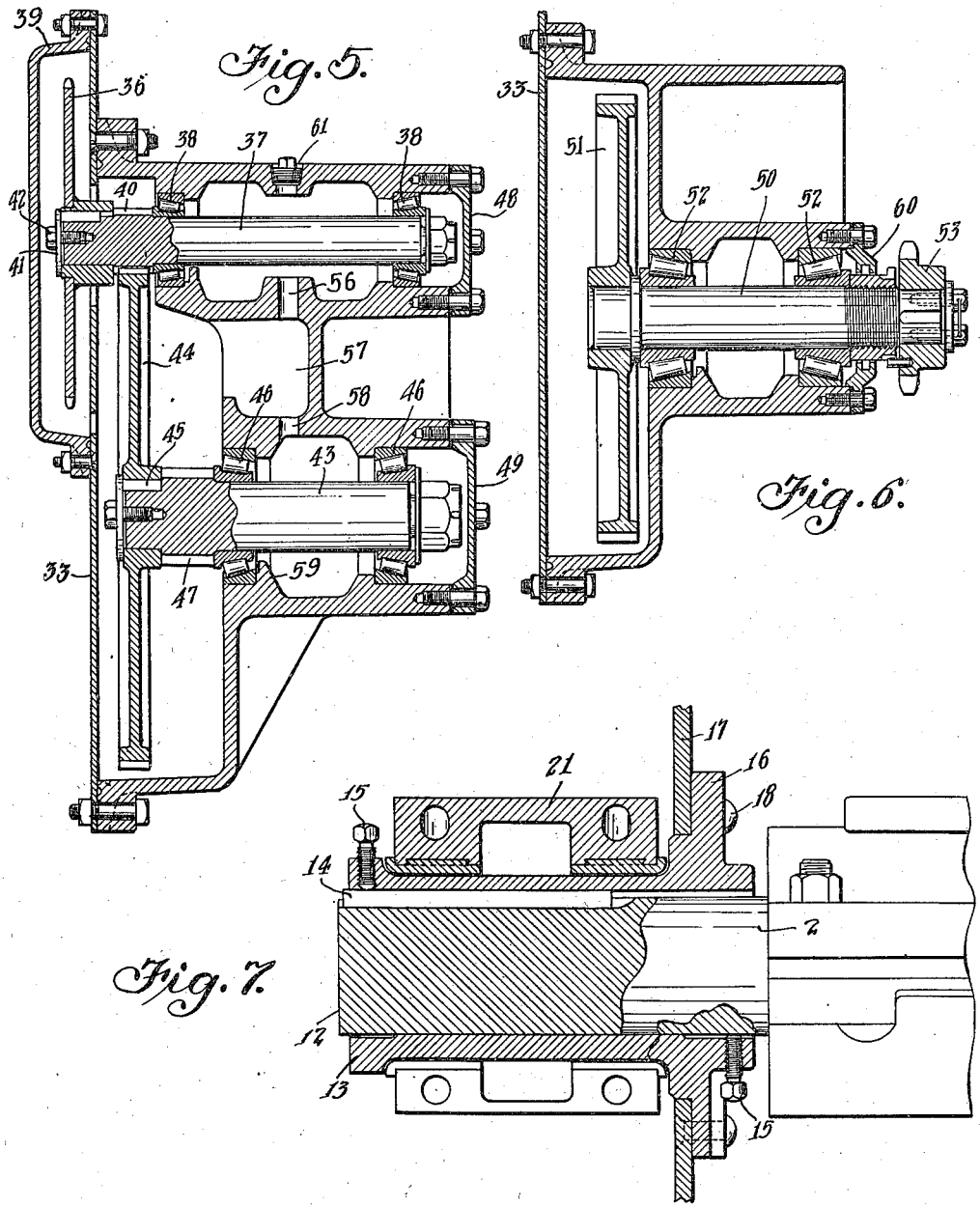

June 18, 1935.　　F. J. YOUNG ET AL　　2,005,122
POWER TRANSMISSION UNIT
Original Filed April 25, 1932　　5 Sheets-Sheet 4

Inventors
Forrest Joseph Young
Spencer William Long
By Lyon & Lyon
Attorneys

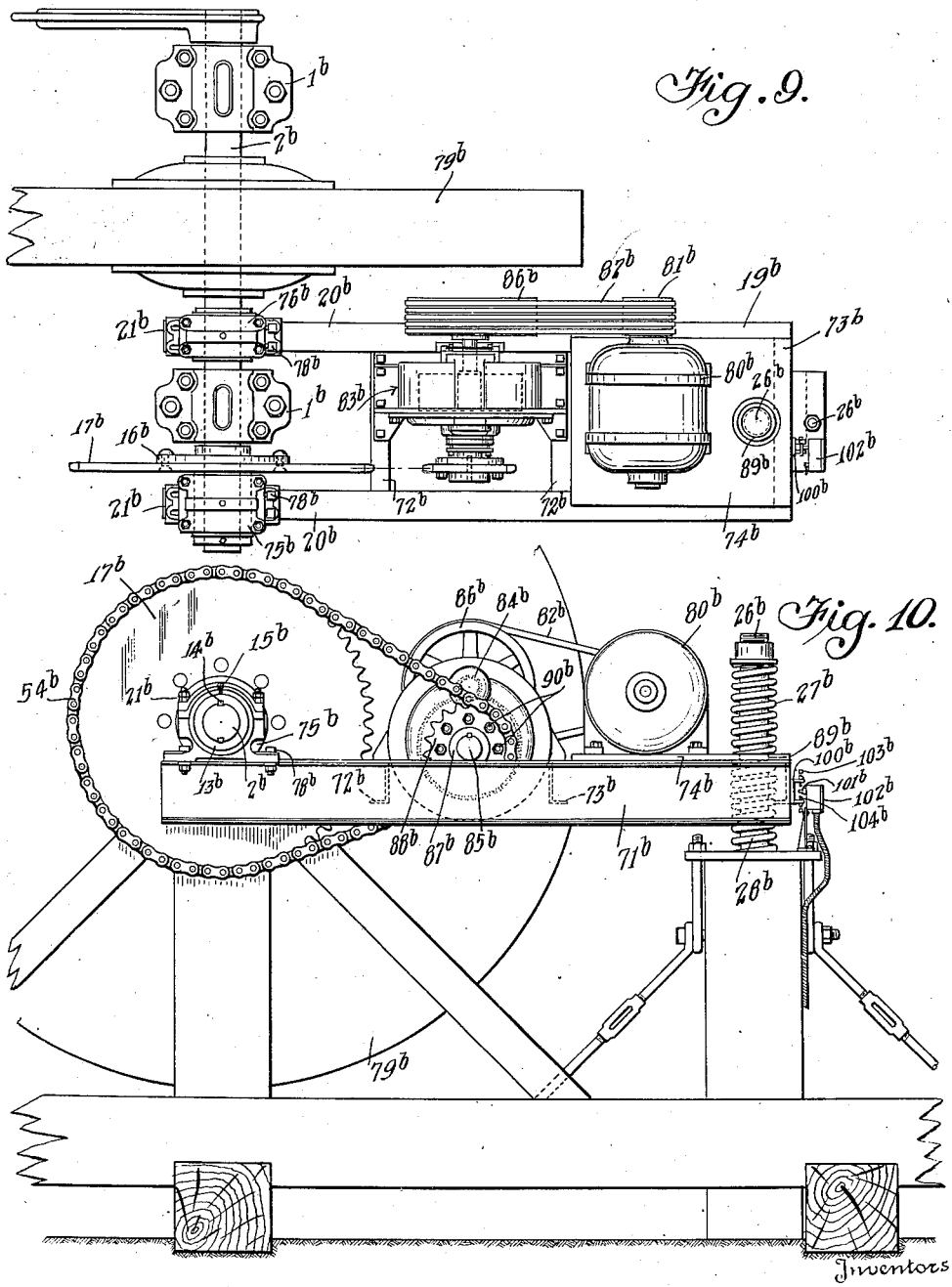

Patented June 18, 1935

2,005,122

UNITED STATES PATENT OFFICE 2,005,122

POWER TRANSMISSION UNIT

Forrest Joseph Young, Los Angeles, and Spencer William Long, Redondo Beach, Calif., assignors, by mesne assignments, to The National Superior Company, Toledo, Ohio, a corporation of Delaware Application April 25, 1932, Serial No. 607,376
Renewed October 15, 1934

23 Claims. (Cl. 192—116.5)

This invention relates to pumping transmission units, and more particularly to an apparatus for use for driving well, and particularly oil well, pumping equipment.

After a well ceases to flow, it is pumped in most cases by or with some form of conventional type of plunger or bucket type pump. Most wells are provided with conventional rig irons, including a walking beam which at one end is connected to a pitman for operation from a crank and at the other end supports and imparts the pumping motion through sucker rods within the well.

The crank of this mechanism is, under ordinary conventional installations, mounted on the band wheel shaft and the band wheel shaft is driven directly by a belt from a pulley driven by a gas engine. In some installations a countershaft is mounted between the gas engine and a band wheel shaft in order to permit operating the engine at its normal rate of speed without using small driving pulleys of an impractical size.

As a well is pumped, the yield decreases so that it becomes necessary to reduce the number and length of strokes. This condition results in slower belt speeds and slower engine speeds which materially reduces the operating efficiency and increases the unit cost of pumping the well. As the unit cost of pumping a well increases as the yield diminishes because of inefficient operating conditions as herein set forth, the cost exceeds the value of oil recovered. The result is the abandonment of wells which otherwise would have a potential yield of oil for many years.

It is therefore an object of this invention to provide a pumping transmission unit which may be directly applied to the shaft of existing installations at a minimum cost and which will efficiently pump a well at a reduced number of strokes with an electric motor to meet the exact power requirements for the individual well.

Another object of this invention is to provide a new pumping transmission device for use in the pumping of oil wells which may be installed in connection with the pumping equipment now utilized with practically no alterations of the existing equipment and no foundation for the new equipment, and which is also so constructed as to be readily removable from one well to another when the well becomes abandoned and which may be installed at a minimum of erection expense and time.

Another object of this invention is to provide a shock-absorbing device as a part of the transmission unit which is so constructed as to minimize the shock imparted to the entire pumping equipment incident to the pick-up of the rods at each stroke.

Another object of this invention is to provide a means for automatically shutting off the electric input to the motor when the well becomes sanded-up or when the sucker rod or some other connection fails. Since the equipment on a well has only infrequent attention, it is very essential that a positive automatic safety feature be provided to save the equipment against injury due to overloading or failure in the rods.

Other objects and advantages of this invention it is believed will be apparent from the following detailed description of a preferred embodiment thereof as illustrated in the accompanying drawings.

In the drawings:

Figure 1 is a front elevation of a pumping transmission unit applied to a conventional pumping installation embodying our invention.

Figure 2 is a top plan view thereof.

Figure 3 is an enlarged plan view of the transmission unit partly in section.

Figure 4 is an enlarged front elevation thereof.

Figure 5 is a sectional end elevation taken substantially on the line 5—5 of Figure 3.

Figure 6 is a sectional view taken substantially on the line 6—6 of Figure 3.

Figure 7 is a fragmental cross-sectional view taken substantially on the line 7—7 of Figure 3.

Figure 9 is a top plan view of the modified form of pumping transmission unit embodying our invention.

Figure 10 is a side elevation thereof.

Figure 11:
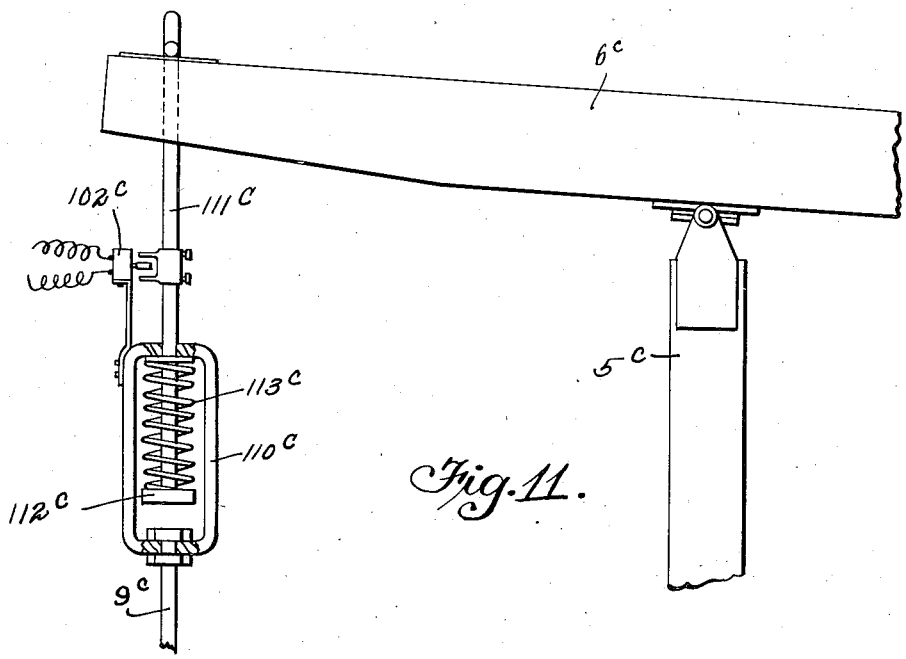
Figure 11 is a fragmental sectional view of a modified form of construction of cut-off means embodied in our invention.
Figure 8:
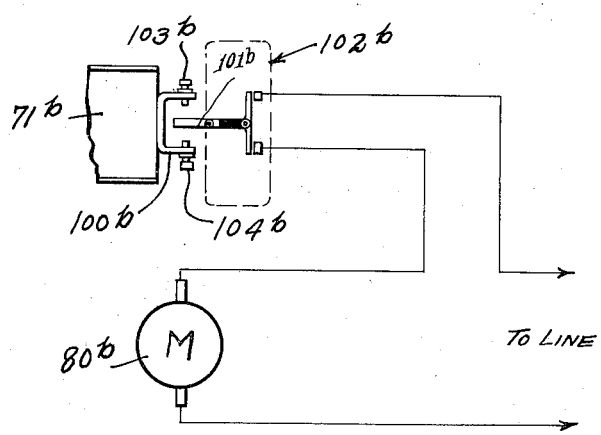
Figure 8 is a diagram of an electrical connection.

In the modification of our invention as illustrated in Figures 1 to 7 inclusive, the conventional installation for pumping a well is illustrated as including two jack post bearings 1 in which a shaft 2 is journalled. A crank 3 is secured to the shaft 2 and is driven thereby. In this installation there is usually provided a band wheel 4 which is likewise secured to the shaft 2. A Samson post 5 pivotally supports a walking beam 6 which is connected at one end by means of the pitman 7 to a wrist pin 8 on the crank 3. The walking beam at its other end is connected by means well understood in the art to a series of rods 9, to the end of which is secured a plunger or bucket of the well pump in a manner well understood in the art.

The bearings 1 are supported on jack posts 10 and the jack posts 10 are rigidly braced as illustrated at 11. The projecting end 12 of the shaft 2 in the conventional rig structure supports a calf wheel sprocket and clutch which are removed in order to permit installation of applicant's pumping transmission unit. Mounted upon, and secured to, the projecting end 12 of the shaft 2 is a sleeve 13 which is secured in position by means of a key 14 and set screws 15. The key 14 fits in the keyway previously used for the calf wheel sprocket clutch key. The sleeve 13 has a flange 16 to which is secured a sprocket wheel 17 by any suitable or desirable means such, for example, as by means of rivets 18.

A transmission frame or drive means support 19 has an extension 20 which terminates in a bearing 21 over the sleeve 13. A bearing cap 22 is bolted to the bearing portion 21 to completely enclose the bearing area on the sleeve 13. By this structure the drive means or transmission unit is maintained accurately aligned with the shaft 2, sprocket 17, and this means of support for the transmission or drive unit does not require a separate supporting structure mounted on the foundation. The opposite or the free end of the support or frame 19 is preferably yieldably supported, and for this purpose we have provided a supporting post 23 on the upper end of which a saddle 24 is secured by suitable means as illustrated at 25.

Secured to the saddle 24 is a bolt 26 which extends through an opening formed in the support 19. Mounted on the bolt 26 on opposite sides of the support 19 are compression springs 27 and 28. The upper end of the bolt 26 is threaded with a nut 29 which may be utilized to adjust the initial depression of the springs 27 and 28 and which likewise acts as an upper end stop of spring 27.

With the support 19 for the transmission unit or driving means pivotally mounted on the shaft 2 and yieldably supported on the bolt 26, the elements of the torque dynamometer are obtained together with a shock-absorbing function which enables the transmission unit to more readily absorb the shocks imposed upon it due to the reversal of the applied load caused when the rods 9 reach the upper and lower extent of their strokes, and due to variations in power requirements as the rods move up and down during the pumping stroke.

The transmission unit 30 is a speed reduction means employed to obtain the desired revolutions of the sprocket 17 from a high speed electric motor 31. The motor 31 is mounted on the support or frame 19. The support 19 is formed to accommodate motors of various sizes, and is also so constructed as to permit adjustment of the motor position to obtain the desired chain slack.

The motor shaft 32 projects through a plate 33 and has mounted thereon a chain sprocket 34. The sprocket 34 is connected to the initial stage of the speed reduction unit by means of a chain 35 which passes over a sprocket 36 secured to a shaft 37. The shaft 37 is rotatably supported on anti-friction bearings 38. A cover 39 is provided for enclosing the sprockets 34 and 36 and chain 35 to protect the same from foreign matter, and permits lubrication of the chain as will hereinafter be described. An oil seal of the conventional type is provided around the motor shaft to prevent any loss of oil through the plate 33 at this opening.

The shaft 37 is provided with a pinion gear 40 formed integral with the shaft and adjacent to the sprocket 36. Sprocket 36 is keyed to the shaft 37 and is secured thereon with a washer 41 and cap screw 42. Within the reduction gear or transmission unit housing within which the shaft 37 is mounted, and below the shaft 37, a second stage speed reduction is obtained on the shaft 43. The shaft 43 is driven from the shaft 37 by the pinion 40 which meshes with the large gear 44 which is keyed at 45 to the shaft 43. The shaft 43 is mounted on anti-friction bearings 46 and has formed integral therewith a pinion gear 47 adjacent to the gear 44. Adjustment of the bearings 38 and 46 is made at the free ends of the shafts 37 and 43 which are enclosed within the housing by means of caps 48 and 49.

A third stage speed reduction is obtained on a shaft 50 which is mounted approximately in the same horizontal plane with the shaft 43 and is driven from the shaft 43 by means of the pinion 47 meshing with a large gear 51 which is secured to the shaft 50. The shaft 50 is journalled on anti-friction bearings 52. The shaft 50 projects from the housing at one end and is provided at this end with a sprocket 53 which is aligned in a vertical plane with the sprocket 17 on the shaft 2. A roller chain 54 connects the sprockets 17 and 53 to obtain a fourth stage reduction between the motor 31 and the shaft 2.

It will be obvious that various over-all speed reductions can be obtained by changing the sprocket chain ratios of the sprockets 34 and 36 and that this change can be readily made in the field by removing the cover 39 and changing the sprockets to give the desired speed ratio.

The plate 33 completes an enclosure for all of the gears within the housing formed or mounted upon the support 19. An oil level is established within this housing at the inlet 55. The rotation of the gears 44 and 51 carries the oil upward to lubricate the mating pinions 40 and 47 respectively. At the point of meshing between these pairs of gears, the oil is forced laterally from the gears into the adjacent bearings 38 and 46.

A boss is provided under the shaft 37 with an opening 56 which returns any overflow of oil from the oil pocket under the shaft 37 to a recess 57 which feeds the oil through the opening 58 into the annular space around the shaft 43, from which point the oil overflows the dam 59 into the lower portion of the housing. Bearings 52 on the shaft 50 are provided with lubricant that drains from the wall of the oil chamber adjacent to the gear 51. An oil seal 60 prevents the oil from leaking from the housing adjacent to the sprocket 53. The rotation of the gears will also agitate the oil into a spray which will lubricate the chain between the sprockets 34 and 36. The transmission unit may be initially filled with oil through the opening at the plug 61.

Where the walking beam 6, or crank 3, is counterbalanced with any of the various conventional methods, there is nevertheless a wide variation of the power requirements throughout each revolution of the crank 3. In many instances the torque changes from a positive quantity to a negative, i.e., the rods on the down stroke will fall at a speed ahead of the pumping speed. This continual variation in power requirements also implies a like variation in the torque reaction which, with this transmission unit, is taken with the springs 28 and 27.

With the crank 3 rotating counter-clockwise (see Figure 1), the driving reaction is taken by spring 28, and when the torque changes to negative, the reaction is taken by spring 27. Consequently, when the torque changes from negative to positive, or vice versa, there is an impulse transmitted to the transmission as a unit, which impulse is absorbed by either spring 28 or 27, thereby minimizing the shock to the sprocket chains and gears within the transmission unit. This shock-absorbing characteristic will also greatly increase the life of the sucker rods 9 as the rate of change in stress will be materially reduced in these parts.

The torque cushioning feature also permits providing a means to cut off the electrical input to the motor in case the well becomes sanded up, or in case the rods or some other connection should fail. In normal operation, the springs 28 and 27 will have a definite and uniform maximum amount of deformation or compression for each stroke of the pump rods 9. This amount of deformation and compression is predetermined and may be adjusted at the nut 29. In case the power requirements for a well increase due to sanding up of the pump connected with the rods 9, then the torque will correspondingly increase and depress spring 28 beyond its normal compressed position. To take advantage of this action, a yoke 62, with adjusting screws 63 and 64 is attached to the frame or support 19 of the transmission unit.

An electric switch 65, with a trip lever 66, is located between the two set screws 63 and 64, and upon the well sanding up, the screw 63 will trip the switch lever 66 and break the electric circuit to the motor 31 and stop the pumping of the well before any injury is done to the equipment. The electric switch 65 also operates to interrupt the operation of the motor in the event the well gets out of balance. When this unbalanced condition develops the torque reaction of the motor reverses in magnitude from a positive to a negative quantity, that is, on the down stroke. The moving equipment, including the rods, operates to run ahead of the speed of the motor with the result that when the spring 27 is compressed beyond a predetermined amount the screw 64 will trip the lever 66 and break the circuit to the motor. Likewise when a connection fails, as, for example, the sucker rod 9 breaks, the reaction incident to the sudden release of power will cause the unit to swing counter-clockwise (Figure 1), and compress spring 27 beyond its normal position, whereupon the set screw 64 will trip the lever 66 and break the circuit to the motor, thereby stopping the pumping action until the operator of the lease finds the well shut down and repairs the broken connection or rods 9.

It is also to be understood that this torque arm principle of mounting a transmission unit can also be applied to other pumping devices not employing the standard rig equipment as herein described. The unit can also be mounted on any part of the crank shaft. It can be mounted on a jack shaft in back of the shaft 2 with a driving connection between the jack shaft and the shaft 2.

It is also to be understood that this device is not limited to any particular range of power requirements, since the transmission unit may be designed to be placed on original pumping installations requiring different speeds and motor characteristics.

In the modified form of our invention illustrated in Figures 9 and 10, similar parts have been designated with similar numerals with the addition of a suffix "b".

This modified structure of our invention pertains particularly to the larger sizes of transmission units which will be required for wells having pumps operated at higher speeds and consequently requiring larger power units. This transmission unit will not require as great an overall speed reduction between the motor and the crank shaft as the first described unit. This modified structure differs from the structure heretofore described in that the support or frame 19b has two extensions 20b which are journaled in bearings 21b on the shaft 2b for the purpose of providing lateral rigidity of the unit. The frame or support 19b consists of two longitudinal structural steel beams 71b having spaced cross bracing members 72b and 73b. The motor base plate 74b is secured to the top flanges of the beam members 71b with a weld or any other desired means, such as bolts or rivets, to provide additional reinforcement to the frame structure. The frame 19b is pivotally supported on the crank shaft 2b by means of bearings 21b which are bolted to the upper flanges of the beam members 71b.

The sprocket assembly that fits on the end of the shaft 2b consists of a sleeve 13b having a flange 16b which corresponds to the first described structure. The sleeve 13b is secured to the shaft 2b by means of keys 14b and set screws 15b. The bearing housing 75b for one bearing 21b is mounted on the sleeve 13b. An adapter sleeve 77b having an outside diameter the same as the sleeve 13b is fixed to the shaft 2b for the purpose of supporting housing 76b for the second bearing 21b. The housings 75b and 76b are adjustably secured to the beams 71b in order to compensate for chain slack which may exist in the chain 54b. This longitudinal adjustment is obtained with bolts 78b in the slotted supporting feet of the housings 75b and 76b. The frame 19b can also be supported on the shaft 2b between the two jackpost boxes 1b when the band wheel 79b is removed.

Mounted on the frame 19b is a motor 80b having a pulley 81b which is grooved for a plurality of V-shaped transmission belts 82b. A reduction gear unit 83b is mounted on the cross brace members 72b of the frame 19b and consists of a single stage reduction between the pinion shaft 84b and the gear shaft 85b. The pinion shaft 84b projects from the housing of the gear unit 83b and has assembled thereon a larger pulley 86b which has grooves in alignment with the grooves in pulley 81b for receiving the belts 82b. The motor 80b may be adjustable longitudinally of the frame 19b to compensate for any slack in the belts 82b.

The driven gear shaft 85b projects from the opposite face of the housing 83b and has provided thereon a sprocket hub 87b which is keyed to the shaft 85b. A sprocket 88b is detachably secured to the hub 87b by any suitable means, such as by bolts 90b, thereby facilitating the assembly of various sizes of sprockets 88b for various speed requirements. A sprocket transmission chain 54b connects the sprockets 17b and 88b.

The meshing gears on the shafts 84b and 85b are totally enclosed in the housing 83b and are supported on antifriction bearings in a conventional manner well known in the art.

In the modified transmission unit illustrated in Figures 9 and 10, the unit is supported in a manner similar to that described in connection with Figures 1 to 7 inclusive. The motor support plate 74b is provided with an aperture 89b, through which the anchor bolt 26b is passed. Springs 27b and 28b are mounted on each side of the plate 74b. The anchor means for the bolt 26b is similar to that heretofore described in the first described modification of our invention.

In order to provide a means for interrupting the drive of our transmission unit when the torque incident to driving the pump rods increases or decreases beyond a given predetermined amount, as is determined by the setting of the springs 27b and 28b so as to prevent injury of the motor in such cases as where the well pump sands up or the rods become disconnected or some other connection fails, we have provided an electrical torque cut-out switch which consists of a yoke 100b which is attached to the cross brace 73b in relation to the trip lever 101b of an electric switch 102b. Set screws 103b and 104b are provided on the yoke 100b to trip the switch under the conditions as described.

In the modified form of structure as illustrated in Figure 11, the electric cut-out means as above described for interrupting the drive of the motor of the transmission unit of our invention is of a modified construction, many forms of which may be provided for interrupting the supply of electric current to the electric motor in case of failure of the pump rods, sanding up of the pump, or some other connection fails. In this form of our invention, the sucker rods 9c are connected to a yoke 110c. A connecting rod 111c is secured to the pumping end of the walking beam 6c so as to permit its end 112c to slide in the yoke 110c. A spring 113c is provided for normally holding the parts in fixed relation or permitting a certain amount of yielding action which is determined by the force exerted by the spring 113c. In case of failure of the rods or some other connection, or of the sanding up of the pump, an electrical switch 102c, similar in all respects to the switch 102b, is caused to be operated by the relative movement of the rod 111c, and the yoke 110c.

Having fully described our invention, it is to be understood that we do not wish to be limited to the details herein set forth, but our invention is of the full scope of the appended claims.

We claim:

1. In a well pumping device, the combination of a pump driving member, means for actuating the pump driving member, means for yieldably supporting the driving means so that as the torque set up by the pump driving member increases or decreases, the driving means is moved in opposition to its yieldable support, and means for interrupting the driving member when the torque thereof increases or suddenly decreases more than a predetermined amount.

2. In a well pumping device, a driven shaft journaled in bearings, means mounted on said shaft to impart a pumping motion, a frame pivotally mounted on said shaft and having power means and power transmission means for driving said shaft, said frame being resiliently supported at a point remote from the shaft axis, said frame having a predetermined maximum oscillation on said resilient means, an electric motor mounted on said frame for driving said transmission means, circuit breaking means for said motor, and means to break an electric circuit to said motor on the oscillation of said frame exceeding a predetermined travel in either direction.

3. In a well pumping apparatus, a driven shaft, a crank mounted on said shaft to impart a pumping motion, a sleeve secured to said shaft and having a sprocket secured as a part thereof, a transmission frame having at one end an extension journalled on said sleeve and at the other end a torque resisting connection, speed reduction means within said frame, a motor driving the first stage of the reduction means, a sprocket secured to the final stage of the reduction means within the frame in alignment with the sprocket on said sleeve, and means operatively connecting said sprockets.

4. In a pumping mechanism, the combination of a frame, a pump drive means, means for supporting one end of the frame, means for supporting the other end of the frame, means mounted on the frame for driving the pump drive means, and means operated from the supporting means at one end of the frame to automatically interrupt the drive of the pump drive means when the resistance to the operation of the driving means increases or suddenly decreases beyond a predetermined amount.

5. In a pump driving mechanism, the combination of a crank, a walking beam, a pitman connecting the walking beam to the crank, pump rods operated by the walking beam, means for driving the crank, a drive means connecting the latter said means and the crank, and means interposed in the said drive mechanism to interrupt operation of the crank driving means when the resistance to the rotation of said crank increases or suddenly decreases beyond a predetermined amount.

6. In a well pumping device, the combination of a pump driving member, means for actuating the pump driving member, means for supporting the pump driving means so that as the torque set up by the pump driving member increases or decreases, the support moves with relation to said increased or decreased torque, and means for interrupting the driving member when the torque thereof increases or suddenly decreases more than a predetermined amount.

7. In a well pumping apparatus, the combination of a shaft with means for imparting a pumping motion, a speed reduction means, means for pivotally mounting the speed reduction means with relation to said shaft, power means to drive said speed reduction means, transmission means operatively connecting said shaft and said speed reduction means, torque resisting means operatively connected to the means for pivotally mounting the speed reduction means to yieldingly resist rotation of the speed reduction means from its normal position, and said speed reduction means having a predetermined maximum oscillation on said yieldable torque resisting means, and means for interrupting the power means when said oscillation exceeds the predetermined maximum.

8. In a pumping mechanism, the combination of a frame, a pump drive means, means for supporting one end of the frame, means for supporting the other end of the frame, means mounted on the frame for driving the pump drive means, and means operated from the supporting means at one end of the frame to automatically interrupt the drive of the pump drive means when the resistance to the operation of the driving means exceeds a predetermined amount.

9. In a well pumping device, the combination of a pump driving member, means for actuating the pump driving member, means for supporting the pump driving means so that as the torque set up by the pump driving member increases or decreases, the support moves with relation to said increased or decreased torque, and means for interrupting the driving member when the torque thereof exceeds a predetermined amount.

10. In a well pumping device, the combination of a pump driving member, means including a motor for actuating the pump driving member, a pivotally mounted frame upon which the motor is mounted, yieldable torque resisting means operatively connected with the frame and operative to permit of a limited range of angular movement of the frame relative to its pivotal axis in response to variations in torque transmitted to the pump driving member, means including an electric circuit breaker operatively associated with said motor supporting frame and operable to interrupt the operation of the motor upon the torque exceeding a predetermined limit.

11. In a well pumping device, the combination of a pump driving member, means including a motor for actuating the pump driving member, a pivotally mounted frame upon which the motor is mounted, yieldable torque resisting means operatively connected with the frame and operative to permit of a predetermined range of angular movement of the frame in either direction relative to its pivotal axis, means including an electric circuit breaker operatively associated with said motor supporting frame and operable to interrupt the operation of the motor upon the frame exceeding a predetermined travel in either direction.

12. In a well pumping device, the combination of a pump driving member, driving means for actuating the pump driving member, means for yieldably supporting the driving means, said yieldable supporting means having a limited range of movement, and means for interrupting the operation of the driving member upon the yieldable supporting means exceeding a predetermined travel.

13. In a well pump driving mechanism, the combination of reciprocating pump rods, drive means for reciprocating said rods, said drive means including a pivotally mounted portion, means for supporting said pivotally mounted portion so that as the torque reaction set up by the pivotally mounted portion increases or decreases, the said portion moves with relation to said increased or decreased torque reaction, and means for interrupting the drive means when the torque transmitted thereby exceeds a predetermined amount.

14. In a well pump driving mechanism, the combination of reciprocating pump rods, drive means for reciprocating said rods, said drive means including a pivotally mounted portion, means for supporting said pivotally mounted portion so that as the torque transmitted by said drive means increases or decreases, the said pivotally mounted portion moves about its support with relation to said increased or decreased torque, and means controlled by the movement of the pivotally mounted portion for interrupting the operation of the drive means when the torque transmitted thereby exceeds a predetermined amount.

15. In a power transmission, the combination of a pivotally mounted frame, a motor on said frame, yieldable torque resisting means operatively connected with the frame, a power transmitting element operatively connected with the motor and adapted to be driven thereby, and means including a circuit breaking device operatively associated with said motor supporting frame and being operable to interrupt the operation of the motor upon the frame exceeding a predetermined pivotal movement relative to its support.

16. In a power transmission, the combination of a pivotally mounted frame, a motor on said frame, yieldable torque resisting means operatively connected with the frame to permit of a limited pivotal movement of said frame in response to variations in the torque transmitted by said motor, a power transmitting element operatively connected with the motor and adapted to be driven thereby, and means including a circuit breaking device operatively associated with said motor supporting frame and being operable to interrupt the operation of the motor upon the torque exceeding a predetermined limit.

17. In a power transmission, the combination of a drive means, means to support said drive means so as to be angularly movable with respect to a certain axis, said means including a yieldable restraining means tending to maintain said drive means in a relatively stationary position, and means operative to interrupt the operation of said drive means upon the angular movement thereof exceeding a predetermined limit.

18. In a power transmission, the combination of a motor, means to support said motor so as to be angularly movable with respect to a certain axis, said means including a yieldable restraining means tending to maintain said motor in a relatively stationary position, a power transmitting element operatively connected with the motor and adapted to be driven thereby, and means operative to stop said motor upon the angular movement thereof exceeding a predetermined limit.

19. In a power transmission, the combination of a motor, means to support said motor so as to be angularly movable with respect to a certain axis, said means including a yieldable restraining means tending to maintain said motor in a relatively stationary position, a power transmitting element operatively connected with the motor and adapted to be driven thereby, and means operative by the angular movement of the motor that is produced incident to its torque reaction against the action of the restraining means for stopping the motor upon the angular movement thereof exceeding a predetermined amount.

20. In a power transmission, the combination of a motor, means to support said motor so as to be angularly movable with respect to a certain axis, said means including a yieldable restraining means tending to maintain said motor in a relatively stationary position, a power transmitting element operatively connected with the motor and adapted to be driven thereby, a trip actuated switch operative to interrupt the operation of the motor upon the angular movement thereof exceeding a predetermined limit incident to its driving torque reaction against the action of the restraining means.

21. In a power transmission, the combination of a motor, means to support said motor so as to be angularly movable with respect to a certain axis, said means including a yieldable restraining means tending to maintain said motor in a relatively stationary position, a power transmitting element operatively connected with the motor and adapted to be driven thereby, a trip actuated switch operative to interrupt the operation of the motor upon the angular movement thereof in one direction exceeding a predetermined limit incident to its driving torque reaction against the action of the restraining means, said switch also being operative to interrupt the operation of the motor upon the angular movement thereof in the opposite direction exceeding a predetermined limit incident to the motor driving torque reaction being reversed in magnitude beyond a predetermined limit.

22. In a power transmission, the combination of a motor, means to support said motor so as to be angularly movable with respect to a certain axis, said means including a yieldable restraining means tending to maintain said motor in a relatively stationary position, a power transmitting element operatively connected with the motor and adapted to be driven thereby, and means operative to stop said motor upon a sudden diminution of the torque reaction of said motor against the action of the restraining means incident to a failure of a member driven by said transmission.

23. In a power transmission the combination of a motor, means to support said motor so as to be angularly movable with respect to a certain axis, said means including yieldable restraining means tending to maintain said motor in a relatively stationary position, a power transmitting element operatively connected with the motor and adapted to be driven thereby, and means operative upon the angular movement of said motor that is produced incident to a reversal of the driving torque reaction against the action of the restraining means for stopping said motor.

FORREST JOSEPH YOUNG.
SPENCER WILLIAM LONG.

DISCLAIMER 2,005,122.—*Forrest Joseph Young*, Los Angeles, and *Spencer William Long*, Redondo Beach, Calif. POWER TRANSMISSION UNIT. Patent dated June 18, 1935, disclaimer filed June 12, 1937, by the assignee, *The National Supply Company of Delaware*.

Hereby enters this disclaimer to claims 15, 16, 17, 18, 19, and 20 in said specification.

[*Official Gazette July 13, 1937.*]

DISCLAIMER 2,005,122.—*Forrest Joseph Young*, Los Angeles, and *Spencer William Long*, Redondo Beach, Calif. POWER TRANSMISSION UNIT. Patent dated June 18, 1935, disclaimer filed June 12, 1937, by the assignee, *The National Supply Company of Delaware*.

Hereby enters this disclaimer to claims 15, 16, 17, 18, 19, and 20 in said specification.

[*Official Gazette July 13, 1937.*]